US009446426B2

(12) United States Patent
Bausen et al.

(10) Patent No.: US 9,446,426 B2
(45) Date of Patent: Sep. 20, 2016

(54) DEVICE AND METHOD FOR PAINTING CURVED OUTER SURFACES OF AN AIRCRAFT

(75) Inventors: Dirk Bausen, Harsefeld (DE); Birgit Kuhlenschmidt, Hamburg (DE); Karl Hausmann, Hamburg (DE); Rolf Bense, Jork (DE); Rebecca Siewert, Hamburg (DE); Daniel Lahidjanian, Hamburg (DE)

(73) Assignee: Airbus Operations GmbH (DE)

( * ) Notice: Subject to any disclaimer, the term of this patent is extended or adjusted under 35 U.S.C. 154(b) by 860 days.

(21) Appl. No.: 12/781,129

(22) Filed: May 17, 2010

(65) Prior Publication Data
US 2010/0304009 A1   Dec. 2, 2010

Related U.S. Application Data

(60) Provisional application No. 61/178,632, filed on May 15, 2009.

(30) Foreign Application Priority Data

May 15, 2009   (DE) ......................... 10 2009 021 608

(51) Int. Cl.
*B05C 5/02* (2006.01)
*B05B 12/02* (2006.01)
*B05B 12/08* (2006.01)
(Continued)

(52) U.S. Cl.
CPC .......... *B05B 12/1409* (2013.01); *B05B 12/02* (2013.01); *B05B 12/10* (2013.01); *B05B 12/124* (2013.01); *B05B 13/0457* (2013.01); *B05B 13/0468* (2013.01); *B05B 13/0473* (2013.01); *B05C 5/0208* (2013.01); *B05C 5/0216* (2013.01); *B41J 3/4073* (2013.01);
(Continued)

(58) Field of Classification Search
USPC ........ 118/323, 668, 695, 300, 313–315, 712, 118/679, 680; 347/2, 102
See application file for complete search history.

(56) References Cited

U.S. PATENT DOCUMENTS 4,885,324 A * 12/1989 Hegedus et al. .............. 524/204
5,908,669 A *  6/1999 Hayashi et al. .............. 524/521
(Continued)

FOREIGN PATENT DOCUMENTS

DE       19852079 A1    5/2000
DE    102004044655 A1    3/2006
(Continued)

*Primary Examiner* — Binu Thomas
(74) *Attorney, Agent, or Firm* — Lerner, David, Littenberg, Krumholz & Mentlik, LLP

(57) ABSTRACT

A device for painting a curved outer surface of an aircraft includes a paint applicator having a plurality of spray painting heads each assigned to one of a plurality of different base color supply units containing one of polyurethane aircraft paint and ink. The device further includes a spatially adjustable positioning device configured to move the paint applicator relative to the curved outer surface and at least one sensor device configured to determine a three-dimensional geometry of the curved outer surface. The device also includes a control unit configured to coordinate a movement of the positioning device with a paint output of the paint applicator, wherein the control unit is configured to alternately activate each of the plurality of spray painting heads so as to produce a picture motif so as to derive a two-dimensional driving geometry based on the three-dimensional geometry.

6 Claims, 1 Drawing Sheet

(51) Int. Cl.
  B41J 3/30 (2006.01)
  B41J 3/407 (2006.01)
  B05B 12/14 (2006.01)
  B05B 13/04 (2006.01)
  B05B 12/10 (2006.01)
  B05B 12/12 (2006.01)
  B41J 25/308 (2006.01)
  B05B 7/24 (2006.01)

(52) U.S. Cl.
  CPC ......... *B05B 7/2472* (2013.01); *B05B 13/0431* (2013.01); *B41J 25/308* (2013.01); *G05B 2219/45013* (2013.01)

(56) References Cited

U.S. PATENT DOCUMENTS

| | | | |
|---|---|---|---|
| 6,096,132 A * | 8/2000 | Kaiba | B05B 13/0452 118/629 |
| 6,341,831 B1 * | 1/2002 | Weber et al. | 347/1 |
| 6,951,375 B2 * | 10/2005 | Patton et al. | 347/3 |
| 7,350,890 B2 | 4/2008 | Baird et al. | |
| 2004/0141784 A1 * | 7/2004 | Patton et al. | 400/323 |
| 2006/0044376 A1 * | 3/2006 | Baird et al. | 347/102 |
| 2006/0068109 A1 * | 3/2006 | Frankenberger et al. | 118/696 |
| 2006/0177597 A1 * | 8/2006 | Ebisawa et al. | 118/313 |
| 2008/0152807 A1 * | 6/2008 | Baird et al. | 427/256 |
| 2008/0182683 A1 * | 7/2008 | Hirau et al. | 473/377 |
| 2009/0235864 A1 * | 9/2009 | Khoury | B05B 12/008 118/668 |
| 2009/0257070 A1 * | 10/2009 | Baird et al. | 358/1.5 |

FOREIGN PATENT DOCUMENTS

DE  202008002514 U1  5/2008
WO  WO 2006026240 A1  3/2006

* cited by examiner

DEVICE AND METHOD FOR PAINTING CURVED OUTER SURFACES OF AN AIRCRAFT

CROSS REFERENCE TO PRIOR APPLICATIONS

Priority is claimed to German Application No. DE 10 2009 021 608.1, filed May 15, 2009 and U.S. Provisional Application No. 61/178,632, filed May 15, 2009. The entire disclosure of both applications is incorporated by reference herein.

The present invention pertains to a device and a method for painting a preferably curved outer surface of an aircraft, comprising a spatially adjustable positioning device for moving a paint applicator relative to the curved outer surface in accordance with a control unit for coordinating the movement of the positioning device with the paint output of the paint applicator in order to produce a picture motif.

The field of application of the invention predominantly concerns the construction of aircraft, namely aircraft for transporting passengers and cargo. In addition, it would also be conceivable to utilize the inventive solution in connection with other aircraft to be provided with a picture motif such as designs, logos or lettering that serve for the proper identification, the airline association or the decoration of an aircraft. The lateral and lower regions of the fuselage or the surfaces of the rudder unit are typically used for such purposes.

BACKGROUND

WO 2006/026240 A1 discloses a device for painting a curved outer surface of an aircraft, in this case a rudder unit of an aircraft. In order to apply picture motifs, a paint applicator is used that applies a pattern of drops of a pigment ink of at least one color onto the outer surface. The special pigment ink is polymerized by means of irradiation with ultraviolet light in order to harden and thusly render resistant the pigment ink. The special paint applicator is moved by means of a positioning device that is realized in the form of a gantry robot in order to move the paint applicator along the three dimensional axes, i.e., particularly also in the form of an advance movement for guiding the paint applicator along the curved outer surface. The desired picture motif is produced by converting a predetermined two-dimensional picture into three-dimensional driving data for the positioning device. A surface model of the outer surface of the aircraft is used for this purpose.

In this technical solution, it appears disadvantageous to utilize pigment ink that does not adhere to the outer surface in a very abrasion-resistant fashion despite the hardening process. During the operation of the aircraft, the picture motif may be damaged, in particular, due to mechanical erosion or the chemical effect of hydraulic oil residues. Although a picture motif with relatively high resolution can be produced with ink jet technology, its application requires a very long production time.

DE 10 2004 044 655 A1 discloses another technical solution for producing a picture motif on a curved outer surface of an aircraft, in which paint material is ejected by means of an inkjet head similar to the above-described inkjet technology. The picture motif is produced by means of a purposeful ejection and diversion of small droplets. This can be realized with a piezo-inkjet head or a thermo-inkjet head. The thusly designed paint applicator is moved along a bend guide rail that follows the curved surface of the aircraft, particularly the aircraft fuselage, in the form of a trolley. Alternatively, the paint applicator may also be arranged on the end of an articulated robot.

In this technical solution, it appears disadvantageous that the technology used is very similar to the inkjet technology that requires relatively long production times. Furthermore, this technology requires that the paint applicator is exactly guided a very short distance of no more than 1 mm from the curved outer surface, wherein this represents a significant challenge with respect to the control technology.

SUMMARY OF THE INVENTION

An aspect of the present invention is to develop a device and a method for painting a curved outer surface of an aircraft that make it possible to durably apply a high-quality picture motif within the shortest production time possible.

The invention includes the technical characteristic that the paint applicator consists of several spray painting heads with different base color supply units for PUR (polyurethane) aircraft paint or ink respectively assigned thereto, wherein the control unit alternately activates these spray painting heads in such a way in order to produce a picture motif that it derives a two-dimensional driving geometry for the paint applicator based on a three-dimensional geometry of the outer surface determined by means of sensor technology.

The advantage of the inventive solution can be seen, in particular, in that the application of PUR aircraft paints makes it possible to achieve a high degree of resistance because the outer surface of the aircraft situated thereunder is also coated with PUR aircraft paint. Consequently, a particularly resistant bond between the paint layers is achieved. Due to the spray painting technology utilized in accordance with the invention, larger surfaces can be provided with a picture motif of sufficient resolution within a shorter period of time than with inkjet technology.

The individual spray painting heads preferably should have an aperture on the order of 0.5 to 1.2 mm, wherein the PUR aircraft paint ejected from this aperture should have a maximum particle size between 1 and 100 µm. Tests showed that such a modification of spray painting heads that are otherwise used for different paint materials suffices for making these spray painting heads suitable for the special PUR aircraft paints.

In this context, it is proposed to utilize a metallic line instead of the conventionally used plastic lines between a paint tank of the base color supply unit and the assigned spray painting head. The advantage of such a metallic line can be seen in that it can be flushed with suitable solvents for the special PUR aircraft paints without being affected by these solvents. Conventional plastic lines, in contrast, would be softened in such a way that they could be destroyed and lead to a failure of the base color supply units.

In order to apply a picture motif that is rich in color detail onto the outer surface of an aircraft, it is proposed, according to a measure that enhances the invention, that the paint applicator features several base color supply units for at least the base colors cyan, magenta, yellow and key that are arranged such that they form the paint applicator. The thusly designed paint applicator is preferably moved over the outer surface line-by-line by the positioning device. In this case, the base colors CMYK are applied point-by-point such that a picture motif with a broad spectrum of colors is obtained due to the superposition of these base colors.

In order to ensure a high processing quality, it is proposed, according to another measure that enhances the invention, that a laser measuring head for determining the three-dimensional geometry of the outer surface to be painted is arranged on the paint applicator. The laser measuring head is connected to the control unit on the input side and specifies the current distance values used by the control unit as actual values in order to drive the positioning device in dependence thereon, namely with respect to the nominal distance from the outer surface that lies within the range of the desired paint application quality. In this case, however, the control unit also takes into account other parameters including the feed pressure for the spray painting heads, the nozzle cross section of the spray painting heads, the viscosity of the PUR aircraft paint and the like.

A positioning device suitable for the present invention can be realized in accordance with two preferred embodiments. According to a first alternative, the positioning device may be realized in the form of a gantry robot of sorts that consists of three movable linear axes that are aligned perpendicular to one another and form a Cartesian coordinate system. Such a positioning device can be realized with relatively low expenditures. The positioning device according to the second alternative should preferably be realized in the form of a multi-axis articulated robot that is more suitable for covering large-area curved surfaces than the first embodiment.

The control unit that, according to the invention, drives the positioning device and the paint applicator in a coordinated fashion should be realized in the form of a software-controlled computer that comprises at least one microprocessor and at least one assigned memory unit, wherein the operation and programming can be realized with the aid of a user interface. A suitable interface consists, for example, of a conventional graphic monitor with input devices such as keypad, joystick and the like.

The software controlling the computer also includes a routine for converting the three-dimensional geometry of the outer surface to be painted that is preferably determined by means of the laser measuring head into a two-dimensional coordinate system that serves for driving the paint applicator. The secondary control unit of the paint applicator is by default designed for spraying a plane surface and this computational conversion that, in principle, represents a mathematical development of the three-dimensional geometry in one plane solves the present interface problems.

BRIEF DESCRIPTION OF THE DRAWINGS

Other measures that enhance the invention are discussed below together with the description of one preferred exemplary embodiment of the invention that refers to the figures. In the drawings.

DETAILED DESCRIPTION

Figure 1:
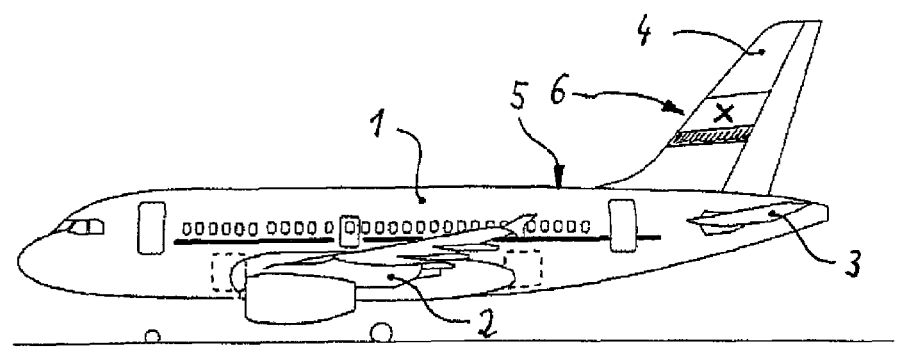
FIG. 1 shows a schematic side view of a passenger aircraft.

According to FIG. 1, an aircraft—that is realized in the form of a passenger aircraft—features a fuselage 1, on which a wing 2 with engines is laterally arranged. The rear side of the fuselage 1 features an elevator unit 3, as well as a rudder unit 4 that protrudes upward from the fuselage 1 by a significant distance.

In this exemplary embodiment, the outer surface 5 of the rudder unit 4 is provided with a photo-realistic picture motif 6 that consists of many color gradations. The outer surface 5 of the rudder unit 4 is essentially curved in one plane, onto which the picture motif 6 is automatically applied in the form of PUR aircraft paint with the aid of the device described below.

Figure 2:
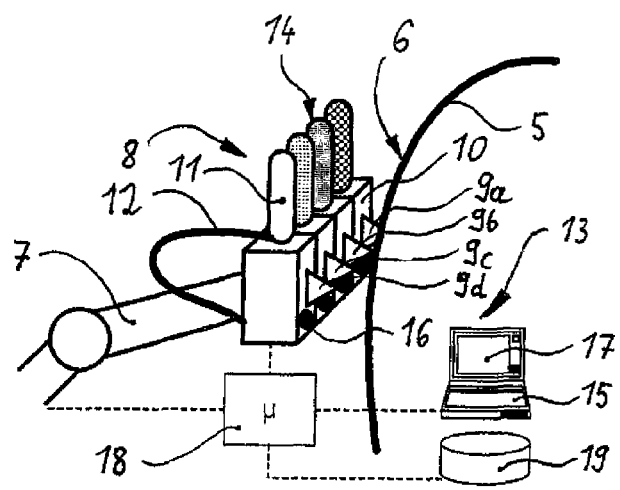
FIG. 2 shows a schematic representation of a device for painting the curved outer surface of the aircraft of FIG. 1.

According to FIG. 2, the device for painting the—only sectionally illustrated—outer surface 5 essentially consists of a spatially adjustable positioning device 7, on which a paint applicator 8 is arranged, wherein the positioning device 7 and the paint applicator 8 are driven along the curved outer surface 5 of the aircraft in a coordinated fashion by means of a common control unit 13 in order to produce the picture motif 6.

The positioning device 7 is realized in the form of a multi-axis articulated robot, on the distal end of which the paint applicator 8 is mounted. The positioning device 7 moves the paint applicator 8 over the outer surface 5 of the aircraft line-by-line.

In this exemplary embodiment, the paint applicator 8 consists of altogether four spray painting heads 9a to 9d with respectively assigned (exemplary) base color supply units. The base color supply units 10 respectively contain PUR aircraft paint 11 of different color, namely cyan, magenta, yellow and key. They are adjacently arranged in a row and thusly form the paint applicator 8.

The spray painting heads 9a to 9d apply the different colors onto the outer surface 5 with the assistance of compressed air, namely in accordance with an electronic control unit 13, such that a colorful picture motif 6 is produced due to the superposition of the different colors.

Each base color supply unit 10 of the paint applicator 8 is assigned a separate paint tank 14 with a supply line 12—that is merely illustrated in an exemplary fashion—leading to the respectively assigned spray painting heads 9a to 9d. The PUR aircraft paint 11 is respectively supplied to the assigned spray painting head 9a to 9d from the paint tank 14 via the supply line 12. In order to ensure the resistance to solvents, the supply line 12 consists of metal, namely of stainless steal in this case.

The three-dimensional geometry of the curved outer surface 5 to be painted is determined by means of a laser measuring head 16 in order to drive the paint applicator 8 by means of the electronic control unit 13. Data for the desired picture motif 6 is also specified for the electronic control unit 13 via a user interface 17, wherein driving data for the paint applicator 6 and the positioning device 7 is calculated therefrom with consideration of the measured three-dimensional geometry of the outer surface 5 to be painted.

In order to fulfill this function, the electronic control unit 13 consists of a software-controlled computer with at least one microprocessor 18 that is connected to a memory unit 19. Among other things, the memory unit 19 contains a library of different picture motifs stored therein. The user interface 17 is also equipped with an input unit 15.

Figure 3:
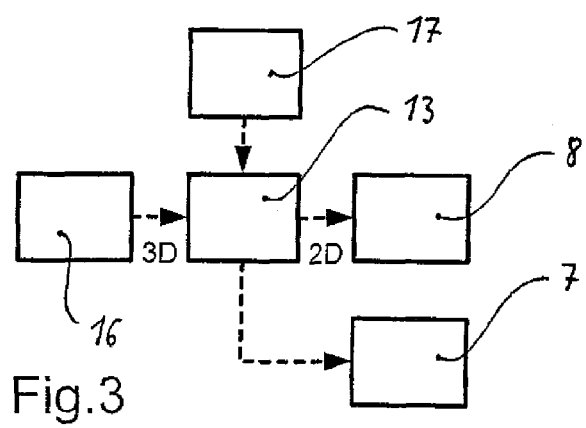
FIG. 3 shows a representation of the control method carried out by the device of FIG. 2 in the form of a block diagram.

According to FIG. 3, picture motif data, as well as the distance measuring data of the laser measuring head 16, is specified for the control unit 13 on the input side by means of the user interface 17. From this, the control unit 13 generates driving data for the paint applicator 8 and the positioning device 7. In order to drive the paint applicator 8 that is by default designed for two-dimensional surfaces, the three-dimensional geometry of the outer surface 5 determined by means of sensor technology is converted into a two-dimensional geometry for driving the paint applicator 8. This conversion is realized in the form of a mathematical development of the three-dimensional geometry of the curved outer surface 5 to be painted in order to apply the picture motif 6 thereon in an undistorted fashion.

As a supplement, it should be noted that "comprising" does not exclude other elements or steps, and that "an" or "a" does not exclude a plurality. It should furthermore be noted that characteristics or steps that were described with reference to one of the above exemplary embodiments can also be used in combination with other characteristics or steps of other above-described exemplary embodiments. Reference symbols in the claims should not be interpreted in a restrictive sense.

LIST OF REFERENCE SYMBOLS

1 Fuselage
2 Wing
3 Elevator unit
4 Rudder unit
5 Outer surface
6 Picture motif
7 Positioning device
8 Paint applicator
9 Spray painting head
10 Base color supply unit
11 Aircraft paint
12 Supply line
13 Control unit
14 Paint tank
15 Input unit
16 Laser measuring head
17 User interface
18 Microprocessor
19 Memory unit

What is claimed is:

1. A device for painting a curved outer surface of an aircraft comprising:
    a plurality of different base color supply units containing polyurethane aircraft paint;
    a paint applicator having a plurality of spray painting heads each assigned to one of the plurality of different base color supply units, each of the plurality of spray painting heads having an aperture of 0.5 to 1.2 mm and the polyurethane aircraft paint ejected from the apertures having a maximum particle size of 0.1 mm, each of the plurality of spray painting heads being configured to eject the particles in a flowing fashion;
    a spatially adjustable positioning device configured to move the paint applicator relative to the curved outer surface;
    at least one sensor device configured to determine a three-dimensional geometry of the curved outer surface, the sensor device including a laser measuring head disposed on the paint applicator; and
    a control unit coordinating a movement of the positioning device with a paint output of the paint applicator, wherein the control unit is configured to alternately activate each of the plurality of spray painting heads so as to produce a picture motif and to derive a two-dimensional driving geometry based on the three-dimensional geometry determined by the at least one sensor device, said two-dimensional geometry to be used by a secondary control unit of the paint applicator while driving the positioning device according to said three-dimensional geometry,
    wherein the laser measuring head is connected to an input side of the control unit and specifies current distance values to be used by the control unit as actual values in order to coordinate the movement of the positioning device with respect to a nominal distance from the outer surface of the aircraft that lies within the range of a desired paint application quality, and
    wherein the control unit coordinates movement the movement of the positioning device using the feed pressure for the spray painting heads, a nozzle cross section of the spray painting heads, and the viscosity of the polyurethane aircraft.

2. The device as recited in claim 1, wherein each of the plurality of base color supply units includes a paint tank having a metallic supply line leading to the respective spray painting head.

3. The device as recited in claim 1, wherein each of the plurality of base color supply units are disposed adjacently in a row and each contains a base color, the base colors including one of cyan, magenta, and yellow.

4. The device as recited in claim 1, wherein the positioning device includes one of a multi-axis articulated robot and a gantry robot configured to map a Cartesian coordinate system.

5. The device as recited in claim 1, wherein the positioning device is configured to move the paint applicator over the curved outer surface in a line-by-line motion.

6. The device as recited in claim 1, wherein the control unit includes a software-controlled computer having at least one microprocessor with at least one assigned memory unit and operable via a user interface.

* * * * *